United States Patent
Yuan et al.

(10) Patent No.: US 8,958,168 B1
(45) Date of Patent: Feb. 17, 2015

(54) METHOD AND SYSTEM FOR PROVIDING AN NFT HAVING IMPROVED MECHANICAL STABILITY

(71) Applicant: Western Digital (Fremont), LLC, Fremont, CA (US)

(72) Inventors: Hongxing Yuan, San Ramon, CA (US); Zhongyan Wang, San Ramon, CA (US); Michael V. Morelli, San Jose, CA (US); Ronald L. Allen, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/631,756

(22) Filed: Sep. 28, 2012

(51) Int. Cl.
*G11B 5/127* (2006.01)
(52) U.S. Cl.
USPC ....... 360/59; 360/122; 369/13.13; 369/13.32; 369/13.33; 369/13.34
(58) Field of Classification Search
None
See application file for complete search history.

(56) References Cited

U.S. PATENT DOCUMENTS

| | | | |
|---|---|---|---|
| 7,724,470 B2 * | 5/2010 | Poon et al. | 360/125.3 |
| 8,014,101 B2 | 9/2011 | Shimazawa et al. | |
| 8,077,418 B1 | 12/2011 | Hu et al. | |
| 8,576,674 B2 * | 11/2013 | Sasaki et al. | 369/13.33 |
| 2011/0090588 A1 * | 4/2011 | Gao et al. | 360/59 |
| 2011/0205863 A1 | 8/2011 | Zhao et al. | |
| 2012/0008229 A1 | 1/2012 | Zhou et al. | |
| 2012/0045662 A1 | 2/2012 | Zou et al. | |

* cited by examiner

*Primary Examiner* — Wayne Young
*Assistant Examiner* — Brian Butcher (57) ABSTRACT

A method and system provides an EAMR transducer. The transducer is coupled with a laser for providing energy and has an air-bearing surface (ABS) configured to reside in proximity to a media during use. The EAMR transducer includes a composite near field transducer (NFT), a write pole and at least one coil for energizing the write pole. The write pole is configured to write to a region of the media. The composite NFT is for focusing the energy onto the region of the media. The composite NFT includes at least one metal and at least one insulator therein.

26 Claims, 6 Drawing Sheets

METHOD AND SYSTEM FOR PROVIDING AN NFT HAVING IMPROVED MECHANICAL STABILITY

BACKGROUND

Figure 1:
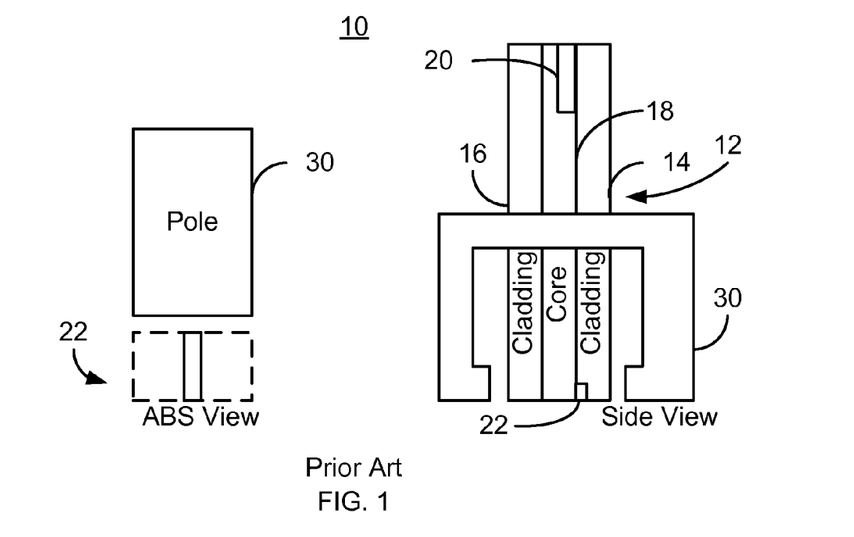
FIG. 1 is a diagram depicting a conventional EAMR transducer.

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12 having cladding 14 and 16 and core 18, a conventional grating 20, a conventional near-field transducer (NFT) 22, and a conventional pole 30. The conventional NFT 22 is typically composed of Au or Ag.

In operation, light from a laser (not shown) is incident on the grating 20, which coupled light to the waveguide 12. Light is guided by the conventional waveguide 12 to the NFT 22 near the air-bearing surface (ABS). The NFT 22 utilizes local resonances in surface plasmons to focus the light to magnetic recording media (not shown), such as a disk. The surface plasmons used by the NFT 22 are electromagnetic waves that propagate along metal/dielectric interfaces. At resonance, the NFT 22 couples the optical energy of the surface plasmons efficiently into the recording medium layer with a confined optical spot which is much smaller than the optical diffraction limit. This optical spot can typically heat the recording medium layer above the Curie point in nano-seconds. High density bits can be written on a high coercivity medium with a pole 30 having modest magnetic field.

Although the conventional EAMR transducer 10 may function, there are drawbacks. The conventional NFT 22 is typically optimized for higher coupling efficiency. For example, the conventional NFT 22 may consist of metals such as Au and Ag to improve the optical efficiency of the conventional NFT 22 above that of other metals. Although a higher optical efficiency is desired to coupling energy to the media (not shown), this also means that the conventional NFT 22 is heated during use. Under extreme conditions, the melting point of the conventional NFT 22 may be approached or reached. Even at lower working temperatures, the conventional NFT 22 may deform. This deformation generally causes the conventional NFT 22 to protrude from the ABS. The conventional NFT 22 may contact the disk or otherwise become damaged. Further, the NFT 22 may undergo plastic as well as elastic deformation, which permanently changes the geometry of the conventional NFT 22. Thus, performance and reliability of the conventional EAMR head 10 may be adversely affected.

Accordingly, what is needed is a system and method for improving performance and reliability of an EAMR transducer.

BRIEF SUMMARY OF THE INVENTION

A method and system provides an EAMR transducer. The transducer is coupled with a laser for providing energy and has an air-bearing surface (ABS) configured to reside in proximity to a media during use. The EAMR transducer includes a composite near field transducer (NFT), a write pole and at least one coil for energizing the write pole. The write pole is configured to write to a region of the media. The composite NFT is for focusing the energy onto the region of the media. The composite NFT includes at least one metal and at least one insulator therein.

DETAILED DESCRIPTION OF THE EMBODIMENTS OF THE INVENTION

Figure 2:
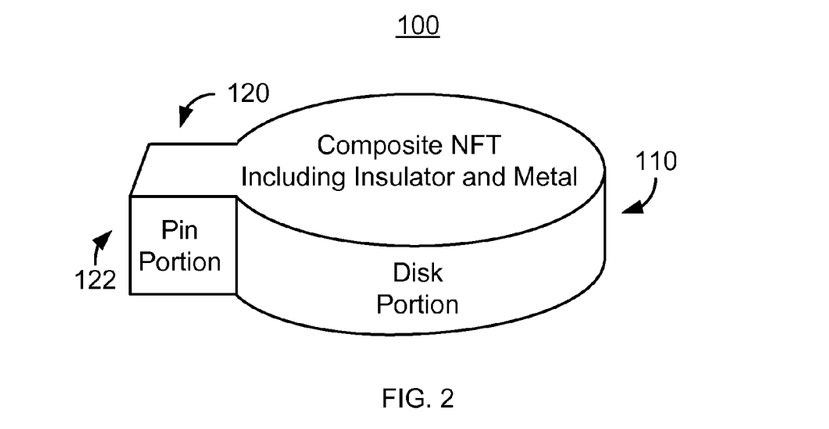
FIG. 2 is a diagram depicting a perspective view of an exemplary embodiment of a composite NFT.

FIG. 2 is a diagram depicting a perspective view of an exemplary embodiment of a composite near field transducer (NFT) 100. For clarity, FIG. 2 is not to scale. The composite NFT 100 includes a disk portion 110 and a pin portion 120. The pin portion 120 is typically closer to the ABS of the transducer in which the composite NFT 100 is used than the disk portion 110. In particular, a surface of the pin portion 120 may be at the ABS. The disk portion 110 is depicted as having a circular footprint. However, in other embodiments, the disk portion 110 may have another footprint including, but not limited to an oval, a square, or another shape. However, it is currently desired to have the disk portion 110 be circular.

The composite NFT 100 includes one or more metals and one or more insulators therein. For example, the composite NFT 100 may include Au, Ag and/or their alloys. The composite NFT 100 may also include one or more oxides such as $SiO_2$, MgO, $Al_2O_3$, $Ta_2O_5$ and C. The insulator may be introduced into the composite NFT 100 in a number of ways. For example, the composite NFT 100 may be a multilayer including metal layers interleaved with oxide layer(s). At least one of the external surfaces of the composite NFT 100 is a metal layer. In some embodiments, the metal layers sandwich the oxide layer(s) so that the outer surface of the composite NFT 100 are metal. However, in other embodiments, one outer surface may be metal while the other is an insulator. In other embodiments, the composite NFT 100 may include insulating particles in a metal matrix. In some embodiments, the insulating particles take the form of small islands formed in the metal matrix. In other embodiments, the insulator may reside in the interstices of the metal lattice. In still other embodiments, the insulator may replace the metal at sites in the metal lattice. In some embodiments, the insulator may reside at or near the grain boundaries. The amount of insulator introduced may be such that the optical efficiency of the composite NFT 100 is not unduly affected. For example, assuming that a pure metal NFT has a one hundred percent optical efficiency, in some embodiments, the optical efficiency of the composite NFT 100 is desired to be at least ninety percent. In other embodiments, however, the optical efficiency of the composite NFT 100 may be less. In some such embodiments, the loss in optical efficiency may be at least partially compensated for by an increase in the power of the laser (not shown in FIG. 2) used in conjunction with the composite NFT 100.

The composite NFT 100 may have enhanced mechanical strength and stability. It is believed that the presence of the insulator in the composite NFT 100 results in the improvement. For example, the insulator may be present in the lattice of the metal, which may anchor dislocations and result in improved toughness and yield strength. The metal may also have smaller grains and, therefore, more grain boundaries. A larger number of grain boundaries is generally associated with improved toughness. The insulator may also result in strain hardening of the composite NFT 100 due to increased dislocations at different crystallographic orientations. For a multiple phase material, the presence of insulating particles may hinder the growth of dislocations, which make the material tougher. Although it is believed that one or more of these phenomena are present in the composite NFT 100, functioning of the composite NFT 100 is not dependent upon a particular mechanism and may include mechanism(s) not described herein.

The performance of an EAMR transducer or other device using the composite NFT 100 may be improved. The composite NFT 100 may have improved mechanical strength and stability. As a result, the composite NFT 100 may be less likely to deform during use and/or may deform less. In addition, if the composite NFT 100 contacts the disk, for example due to deformation of the disk and/or the composite NFT 100, the composite NFT 100 is more likely to survive the impact. The composite NFT 100 may thus be more robust. Further, if the insulator in the composite NFT 100 is introduced in small enough concentrations, the optical efficiency of the composite NFT 100 may not be unduly affected. Thus, performance and reliability of the composite NFT 100 and a device using the composite NFT 100 may be enhanced.

Figure 3:
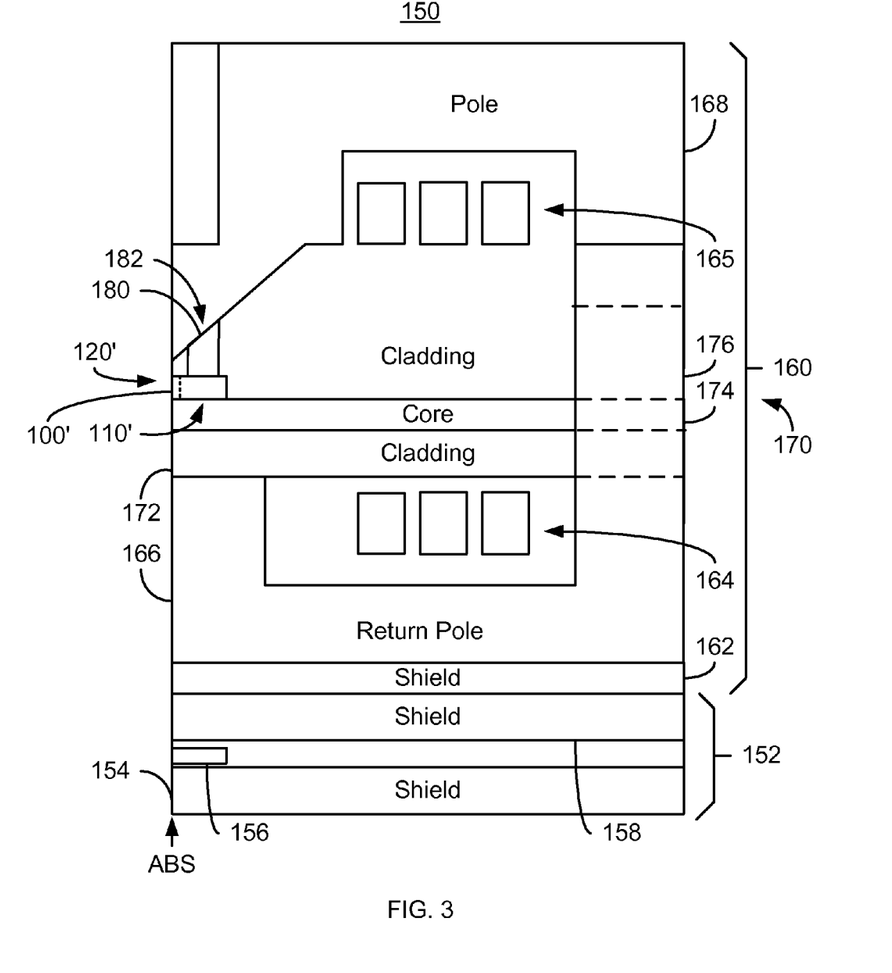
FIG. 3 is a diagram depicting an exemplary embodiment of an EAMR head.

FIG. 3 depicts one embodiment of an EAMR head 150 using a composite NFT 100'. For clarity, FIG. 3 is not to scale. For simplicity not all portions of the EAMR head 150 are shown. In addition, although the EAMR head 150 is depicted in the context of particular components other and/or different components may be used. Further, the arrangement of components may vary in different embodiments. The EAMR head 150 may be used in an EAMR disk drive. The EAMR head 150 includes a read transducer 152 and a write transducer 160. The read transducer 152 includes shields 154 and 158 and reader sensor 156. In some embodiment, the read sensor 156 may be a giant magnetoresistance sensor, such as a spin tunneling junction. However, in other embodiments, another sensor may be used.

The EAMR transducer 150 includes waveguide 170, write pole 168, return pole 166, coil(s) 164 and 165, and shield 162. The EAMR transducer 160 may also include a grating (not shown) that is used to couple light from the laser (not shown) to the waveguide 170. The coil(s) 164 may be used to energize the write pole 140 during writing. In the embodiment shown, the shield 162 is depicted as separate from the return pole 166. However, in another embodiment, these components may be combined. The waveguide 170 includes cladding 172 and 176 as well as core 174. Further, the waveguide 170 is shown as residing between the pole 168 and return pole 166. In another embodiment, the pole 168 may be between the waveguide and the return pole 166. The coils 164 and 165 may form a single, helical coil or may be separate pancake coils.

The EAMR transducer 150 also includes a composite NFT 100' and heat sink 180. The composite NFT 100' is analogous to the composite NFT 100. The composite NFT 100' thus includes a disk portion 110' and pin portion 120' analogous to the disk portion 110 and pin portion 120, respectively. The pin portion 120' is between the disk portion 110' and the ABS. Thus, the disk portion 110' is recessed from the ABS and thus is shown by a dashed line in the ABS view of FIG. 3. The disk portion 110' extends further in the track width direction (perpendicular to the plane of the page in FIG. 3) than the pin portion 120'. Although termed a disk, the disk portion 110' of the composite NFT 100' need not be disk-shaped. For example, instead of having a circular cross-sectional shape, the disk portion 110' may be square, rectangular, or have another shape.

The composite NFT 100' includes one or more metals and one or more insulators therein. For example, the composite NFT 100' may include Au, Ag and/or their alloys. The composite NFT 100' may also include one or more oxides such as $SiO_2$, MgO, $Al_2O_3$, $Ta_2O_5$ and C. The insulator may be introduced into the composite NFT 100' in a number of ways. For example, the composite NFT 100' may be a multilayer including metal layers interleaved with oxide layer(s) or insulating particles in a metal matrix. The insulating particles may take the form of small islands formed in the metal matrix, may reside in the interstices of the metal lattice, and/or may replace the metal at sites in the metal lattice. The amount of insulator introduced may be such that the optical efficiency of the composite NFT 100' is not unduly affected. For example, the optical efficiency of the composite NFT 100' may be at least ninety percent, where one hundred percent is the optical efficiency of a pure metal NFT. This may be achieved, for example, by using not more than four insulating layers interleaved with five metal layers. The insulating layers may be at least 1.5 nanometers thick and not more than 2.5 nanometers thick. In some embodiments, the total thickness of the composite NFT 100' is not more than fifty nanometers. In some embodiments, the insulator is at least two volume percent of the composite NFT 100'. In other embodiments, the insulator is not more than ten volume percent of the composite NFT 100'. However in other embodiments, other volume percentages of insulator may be used in the composite NFT 100'.

A heat sink 180 that is in thermal contact with the disk portion 110' of the composite NFT 100' is also shown. The heat sink 180 also has a top surface 182 in thermal contact with the pole 168. In the embodiment shown, the heat sink 180 is in direct physical contact with the composite NFT 100' and the pole 168. The top surface 182 of the heat sink 180 is sloped because the bottom surface of the pole 168 is sloped. In the embodiment shown, a portion of the bottom surface of the pole 168 proximate to the ABS is not parallel to the top surface of the composite NFT 100'. In some embodiments, this portion of the bottom surface of the pole 168 may be configured to be parallel to the top surface of the composite NFT 100'.

In operation the waveguide 170 directs energy from the laser to the ABS and more specifically to the composite NFT 100'. The composite NFT 100' is optically coupled with the waveguide 170, receiving energy from the core 174. The composite NFT 100' is also proximate to the ABS. For example, the composite NFT 100' is shown as having a surface of the pin portion 120' occupying part of the ABS. The composite NFT 100' focuses energy from the waveguide 170 onto a region of the media (not shown). In particular, a surface plasmon resonance is developed across the disk portion 110' of the composite NFT 100'. This resonance allows the composite NFT 100' to deliver optical energy to the media (not shown) in a small thermal spot. The write pole 168 is configured to write to the region of the media heated by the composite NFT 100'. The heat sink 180 is thermally coupled near its bottom with the composite NFT 100' and at its top with the bottom surface of the pole 168. During operation, therefore, heat generated at the composite NFT 100' may be conducted by the heat sink 180 away from the composite NFT 100' and to the pole 168.

The performance of an EAMR transducer 160 may be improved. The composite NFT 100' may have improved mechanical strength and stability. As a result, the composite NFT 100' may be less likely to deform during use and/or may deform less. In addition, if the composite NFT 100' contacts the disk (not shown in FIG. 3), the composite NFT 100' is more likely to survive the impact. The composite NFT 100' may thus be more robust. Further, if the insulator in the composite NFT 100' is introduced in small enough concentrations, the optical efficiency of the composite NFT 100' may not be unduly affected. Alternatively, the laser power may be increased to at least partially account any reduction in optical efficiency of the composite NFT 100'. Thus, performance and reliability of the composite NFT 100' and the EAMR transducer 160 may be enhanced.

Figure 4:
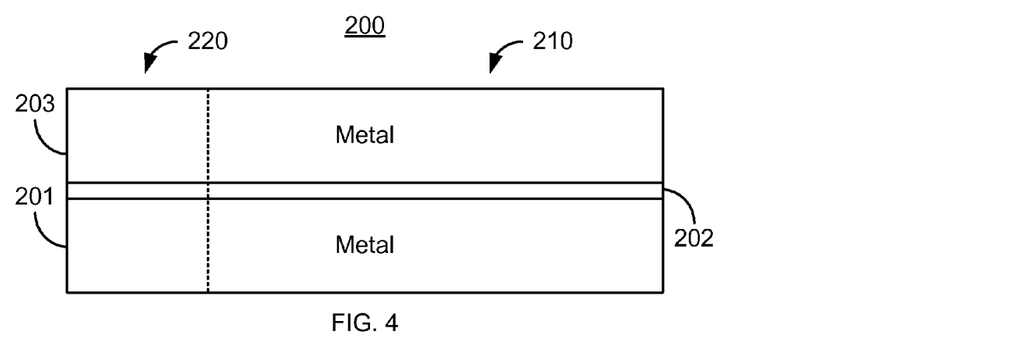
FIG. 4 is a diagram depicting a side view of an exemplary embodiment of a composite NFT.

FIG. 4 is a diagram depicting a side view of an exemplary embodiment of a composite near field transducer (NFT) 200. For clarity, FIG. 4 is not to scale. The composite NFT 200 is analogous to the composite NFTs 100 and 100'. The composite NFT 200 includes a disk portion 210 and a pin portion 220 that are analogous to the disk portions 110 and 110' and the pin portions 120 and 120', respectively. The pin portion 220 is typically closer to the ABS of the transducer in which the composite NFT 200 is used than the disk portion 210. In particular, a surface of the pin portion 220 may be at the ABS. The disk portion 210 may have a circular footprint. However, in other embodiments, the disk portion 210 may have another footprint including, but not limited to an oval, a square, or another shape. However, it is currently desired to have the disk portion 210 be circular.

The composite NFT 200 includes one or more metals and one or more insulators therein. In particular, the composite NFT 200 includes metal layers 201 and 203 sandwiching insulating layer 202. For example, the metal layers 201 and 203 may include Au, Ag and/or their alloys. The metal layers 201 and 203 at surfaces of the composite NFT 200 are configured to focus the energy from the laser. For example, surface plasmons may be developed on the top surface and bottom surface of the metal layers 203 and 201, respectively. The insulating layer 202 may include one or more oxides such as $SiO_2$, MgO, $Al_2O_3$, $Ta_2O_5$ and C. In the embodiment shown, the metal layers 201 and 203 are close to but less than half of the thickness of the composite NFT 200. In some embodiments, the insulating layer 202 is at least one nanometer thick. In some such embodiments, the insulating layer 202 has a thickness of at least 1.5 and not more than 2.5 nanometers. In some embodiments, the insulating layer 202 is two nanometers thick, within processing limitations. In some embodiments, the composite NFT 200 has a thickness of not more than fifty nanometers. Thus, the metal layers 201 and 203 may be not more than twenty-four nanometers thick.

The performance of the composite NFT 200 and device(s) using the composite NFT 200 may be improved. The composite NFT 200 may have improved mechanical strength and stability. As a result, the composite NFT 200 may be less likely to deform during use, may deform less, and/or may be more likely to survive any impact. The composite NFT 200 may thus be more robust. Further, the optical efficiency of the composite NFT may not be unduly affected. Thus, performance and reliability of the composite NFT 200 and the device using the composite NFT 200 may be enhanced.

Figure 5:
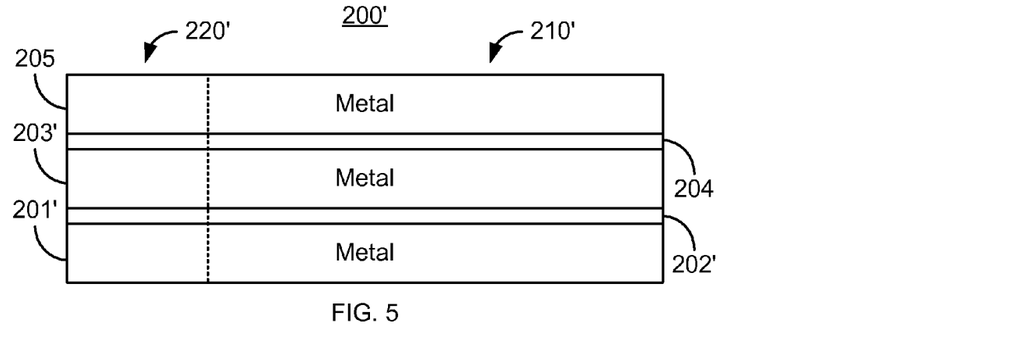
FIG. 5 is a diagram depicting a side view of another exemplary embodiment of a composite NFT.

FIG. 5 is a diagram depicting a side view of an exemplary embodiment of a composite near field transducer (NFT) 200'. For clarity, FIG. 5 is not to scale. The composite NFT 200' is analogous to the composite NFTs 100, 100', and 200. The composite NFT 200' includes a disk portion 210' and a pin portion 220' that are analogous to the disk portions 110/110'/210 and the pin portions 120/120'/220, respectively. The pin portion 220' is typically closer to the ABS of the transducer in which the composite NFT 200' is used than the disk portion 210'. In particular, a surface of the pin portion 220' may be at the ABS. The disk portion 210' may have a circular footprint. However, in other embodiments, the disk portion 210' may have another footprint.

The composite NFT 200' includes one or more metals and one or more insulators therein. In particular, the composite NFT 200' is shown as including three metal layers 201', 203' and 205 interleaved with and sandwiching insulating layers 202' and 204. For example, the metal layers 201', 203' and 205 may include Au, Ag and/or their alloys. The metal layers 201' and 205 at surfaces of the composite NFT 200' are configured to focus the energy from the laser. For example, surface plasmons may be developed on the top surface and bottom surface of the metal layers 205 and 201', respectively. It is currently desired that both metal layers 201' and 205 be included. However, in some embodiments, the metal layer 205 or 201' may be omitted. In such embodiments, one of the surfaces of the composite NFT 200' is formed of insulating layer 204 or 202, respectively. However, the other surface would still be a metal layer 201' or 205, respectively. Thus, at least one of the external surfaces of the composite NFT 200' is metal and would be used to develop surface plasmons.

In the embodiment shown, the insulating layers 202' and 204 are each at least one nanometer thick. In some such embodiments, the insulating layers 202' and 204 each has a thickness of at least 1.5 and not more than 2.5 nanometers. In some embodiments, the insulating layers 202' and 204 each is two nanometers thick, within processing limitations. Thus, the metal layers 201', 203' and 205 may be less than one third of the thickness of the composite NFT 200'. In some embodiments, the composite NFT 200' has a thickness of not more than fifty nanometers.

The performance of the composite NFT 200' and device(s) using the composite NFT 200' may be improved. The composite NFT 200' may have improved mechanical strength and stability. As a result, the composite NFT 200' may be less likely to deform during use, may deform less, and/or may be more likely to survive any impact. Thus, performance and reliability of the composite NFT 200' and the device using the composite NFT 200' may be enhanced.

Figure 6:
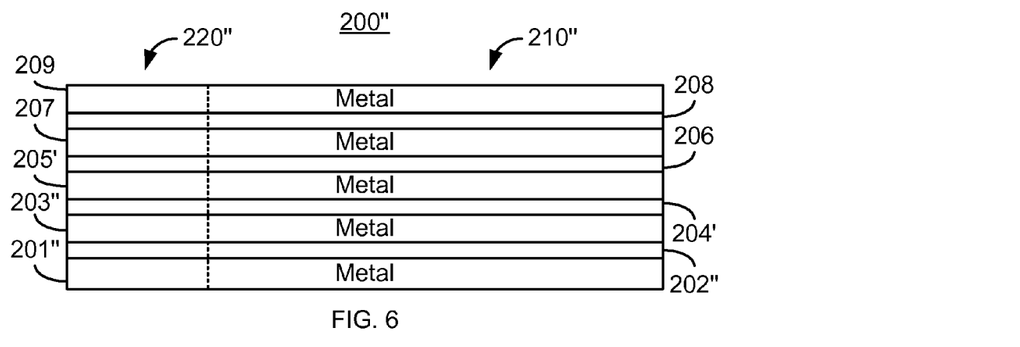
FIG. 6 is a diagram depicting a side view of another exemplary embodiment of a composite NFT.

FIG. 6 is a diagram depicting a side view of an exemplary embodiment of a composite near field transducer (NFT) 200". For clarity, FIG. 6 is not to scale. The composite NFT 200" is analogous to the composite NFTs 100, 100', 200 and 200'. The composite NFT 200" includes a disk portion 210" and a pin portion 220" that are analogous to the disk portions 110/110'/210/210" and the pin portions 120/120'/220/220', respectively. The pin portion 220" is typically closer to the ABS of the transducer in which the composite NFT 200" is used than the disk portion 210". In particular, a surface of the pin portion 220" may be at the ABS. The disk portion 210" may have a circular footprint. However, in other embodiments, the disk portion 210' may have another footprint.

The composite NFT 200" is shown as including five metal layers 201", 203", 205', 207 and 209 interleaved with and sandwiching insulating layers 202", 204', 206 and 208. For example, the metal layers 201', 203', 205', 207 and 209 may include Au, Ag and/or their alloys. The metal layers 201" and 209 at surfaces of the composite NFT 200" are configured to focus the energy from the laser. For example, surface plasmons may be developed on the top surface and bottom surface of the metal layers 209 and 201", respectively. It is currently desired that both metal layers 201" and 209 be included. However, in some embodiments, the metal layer 209 or 201" may be omitted. In such embodiments, one of the surfaces of the composite NFT 200" is formed of insulating layer 208 or 202, respectively. However, the other surface would still be a metal layer 201" or 209, respectively. Thus, at least one of the external surfaces of the composite NFT 200" is metal and would be used to develop surface plasmons.

In the embodiment shown, the insulating layers 202", 204', 206 and 208 are each at least one nanometer thick. In some such embodiments, the insulating layers 202", 204', 206 and 208 each has a thickness of at least 1.5 and not more than 2.5 nanometers. In some embodiments, the insulating layers 202", 204', 206 and 208 each is two nanometers thick, within processing limitations. Thus, the metal layers 201', 203', 205', 207 and 209 may be less than one fifth of the thickness of the composite NFT 200". In some embodiments, the composite NFT 200" has a thickness of not more than fifty nanometers. In addition, note that for the composite NFTs 200, 200' and 200" the volume percentage of insulator from the layers 202, 202' and 204, and 202', 204', 206 and 208 is desired to be at least two volume percent. In some such embodiments, the volume percentage of the insulator in the composite NFTs 200, 200' and 200" is at least four volume percent. In some embodiments, the insulator is not more than twenty volume percent. In some such embodiments, the volume percentage of the insulator is not more than sixteen.

The performance of the composite NFT 200" and device(s) using the composite NFT 200" may be improved. The composite NFT 200" may have improved mechanical strength and stability. As a result, the composite NFT 200" may be less likely to deform during use, may deform less, and/or may be more likely to survive any impact. Thus, performance and reliability of the composite NFT 200" and the device using the composite NFT 200" may be enhanced.

Figure 7:
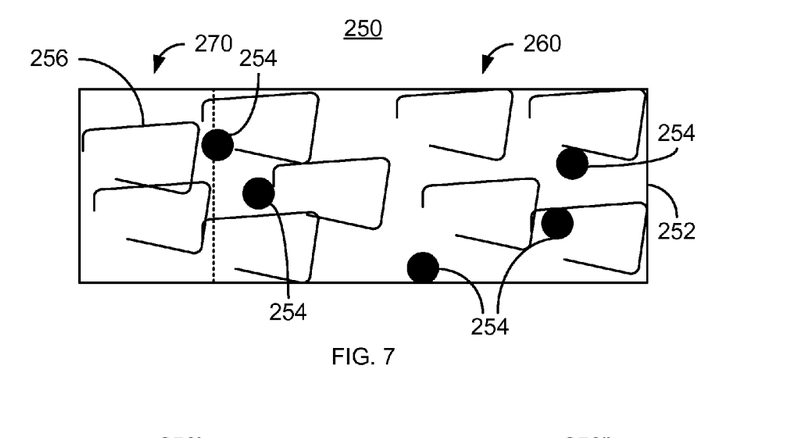
FIG. 7 is a diagram depicting a side view of another exemplary embodiment of a composite NFT.

FIG. 7 is a diagram depicting a side view of an exemplary embodiment of a composite near field transducer (NFT) 250. For clarity, FIG. 7 is not to scale. The composite NFT 250 is analogous to the composite NFTs 100 and 100' and, to a certain extent to composite NFTs 200, 200' and 200". The composite NFT 250 includes a disk portion 260 and a pin portion 270 that are analogous to the disk portions 110 and 110' and the pin portions 120 and 120', respectively. The pin portion 270 is typically closer to the ABS of the transducer in which the composite NFT 250 is used than the disk portion 260. In particular, a surface of the pin portion 270 may be at the ABS. The disk portion 260 may have a circular footprint. However, in other embodiments, the disk portion 310 may have another footprint including, but not limited to an oval, a square, or another shape. However, it is currently desired to have the disk portion 260 be circular.

The composite NFT 250 includes one or more metals and one or more insulators therein. In particular, the composite NFT 250 includes a metal matrix 252 and insulating particles 254. For example, the metal matrix 252 may include Au, Ag and/or their alloys. The metal matrix 252 at surfaces of the composite NFT 250 is configured to focus the energy from the laser. The insulating particles 254 may include one or more oxides such as $SiO_2$, $MgO$, $Al_2O_3$, $Ta_2O_5$ and C. The metal in the composite NFT 250 is considered to be a metal matrix 252 because the volume percentage of metal in the composite NFT 250 generally exceeds the volume percentage occupied by the insulating particles 254. In some embodiments, the insulating particles 254 occupy not more than twenty volume percent of the composite NFT 250. In some such embodiments, the insulating particles 254 occupy not more than sixteen volume percent of the composite NFT 250. In some such embodiments, insulating particles 254 occupy not more than eight volume percent of the composite NFT 250. In some such embodiments, insulating particles 254 occupy at least than two volume percent of the composite NFT 250. In the embodiment shown, the insulating particles 254 tend to aggregate at or near grain boundaries in the metal matrix 252. However, in other embodiments, the insulating particles 254 may tend to aggregate in another fashion. The insulating particles 254 are small islands of insulating material that aggregate within the metal matrix 252. In general, the insulating particles 254 include multiple atoms/molecules of the insulator and do not reside in the interstices of or replace metal atoms in the lattice of the metal matrix 252. Instead, the insulating particles 254 are large enough that the lattice for the metal matrix 252 grows around them.

The performance of the composite NFT 250 and device(s) using the composite NFT 250 may be improved. The composite NFT 250 may have improved mechanical strength and stability. As a result, the composite NFT 250 may be less likely to deform during use, may deform less, and/or may be more likely to survive any impact. The composite NFT 250 may thus be more robust. Further, the optical efficiency of the composite NFT may not be unduly affected. Thus, performance and reliability of the composite NFT 250 and the device using the composite NFT 250 may be enhanced.

Figure 8:
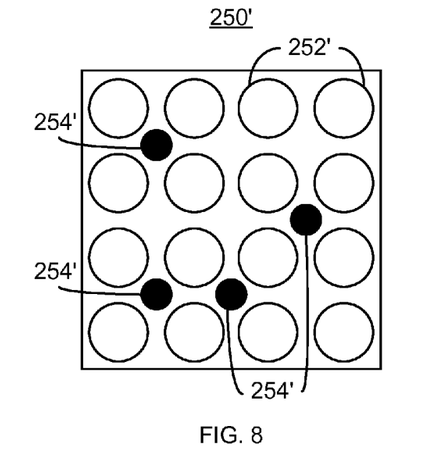
FIG. 8 is a diagram depicting a side view of another exemplary embodiment of a composite NFT.

FIG. 8 is a diagram depicting a side view of an exemplary embodiment of a composite near field transducer (NFT) 250'. For clarity, FIG. 8 is not to scale. The composite NFT 250' is analogous to the composite NFTs 100, 100' and 250. Only a small portion of the composite NFT 250' is shown. However, the composite NFT 250' includes a disk portion (not expressly labeled) and a pin portion (not expressly labeled) that are analogous to the disk portions 110/110'/260 and the pin portions 120/120'/270, respectively.

The composite NFT 250' includes one or more metals and one or more insulators therein. In particular, the composite NFT 250' is shown as including a metal matrix 252' mixed with insulating particles 254'. For example, the metal matrix 252' may include Au, Ag and/or their alloys. At least one of the external surfaces of the composite NFT 250' develops surface plasmons, which may be used to provide energy to a media (not shown) for magnetic recording. The insulating particles 254' may include one or more oxides such as $SiO_2$, $MgO$, $Al_2O_3$, $Ta_2O_5$ and C. The metal in the composite NFT 250' is considered to be a metal matrix 252' because the volume percentage of metal in the composite NFT 250' generally exceeds the volume percentage occupied by the insulating particles 254'. In some embodiments, the insulating particles 254' occupy not more than twenty volume percent of the composite NFT 250'. In other embodiments, the insulating particles 254' occupy not more than sixteen volume percent of the composite NFT 250'. In some such embodiments, insulating particles 254' occupy not more than eight volume percent of the composite NFT 250'. In some such embodiments, insulating particles 254' occupy at least than two volume percent of the composite NFT 250'. In the embodiment shown in FIG. 8, the insulating particles 254' are small and reside in the interstices of the lattice of the metal matrix 252'. The composite NFT 250' may be considered to include an interstitial alloy of metal 252' and insulator 254'. Thus, the insulating particles 254' may be considered to be a solute that is dissolved in the metal matrix 252'.

The performance of the composite NFT 250' and device(s) using the composite NFT 250' may be improved. Because of the presence of the insulating particles 254', the composite NFT 250' may have improved mechanical strength and stability. As a result, the composite NFT 250' may be less likely to deform during use, may deform less, and/or may be more likely to survive any impact. The composite NFT 250' may thus be more robust. Further, the optical efficiency of the composite NFT may not be unduly affected. Thus, performance and reliability of the composite NFT 250' and the device using the composite NFT 250' may be enhanced.

Figure 9:
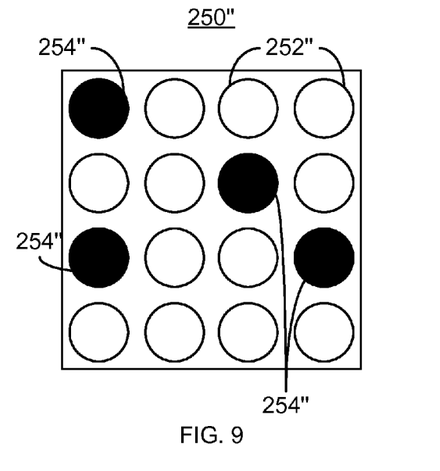
FIG. 9 is a diagram depicting a side view of another exemplary embodiment of a composite NFT.

FIG. 9 is a diagram depicting a side view of an exemplary embodiment of a composite near field transducer (NFT) 250". For clarity, FIG. 9 is not to scale. The composite NFT 250" is analogous to the composite NFTs 100, 100', 250 and 250'. Only a small portion of the composite NFT 250" is shown. However, the composite NFT 250" includes a disk portion (not expressly labeled) and a pin portion (not expressly labeled) that are analogous to the disk portions 110/110'/260 and the pin portions 120/120'/270, respectively.

The composite NFT 250" includes one or more metals and one or more insulators therein. In particular, the composite NFT 250" is shown as including a metal matrix 252" mixed with insulating particles 254". For example, the metal matrix 252" may include Au, Ag and/or their alloys. At least one of the external surfaces of the composite NFT 250" develops surface plasmons, which may be used to provide energy to a media (not shown) for magnetic recording. The insulating particles 254" may include one or more oxides such as $SiO_2$, MgO, $Al_2O_3$, $Ta_2O_5$ and C. The metal in the composite NFT 250" is considered to be a metal matrix 252" because the volume percentage of metal in the composite NFT 250" generally exceeds the volume percentage occupied by the insulating particles 254". In some embodiments, the insulating particles 254' occupy not more than twenty volume percent of the composite NFT 250'. In other embodiments, the insulating particles 254" occupy not more than sixteen volume percent of the composite NFT 250". In some such embodiments, insulating particles 254" occupy not more than eight volume percent of the composite NFT 250". In some such embodiments, insulating particles 254" occupy at least than two volume percent of the composite NFT 250'. In the embodiment shown in FIG. 9, the insulating particles 254" replace metal at sites in the lattice of the metal matrix 252". The composite NFT 250" may be considered to include a substitutional alloy of metal 252" and insulator 254". Thus, the insulating particles 254" may be considered to a solute that is dissolved in the metal matrix 252".

The performance of the composite NFT 250" and device(s) using the composite NFT 250" may be improved. Because of the presence of the insulating particles 254", the composite NFT 250" may have improved mechanical strength and stability. As a result, the composite NFT 250" may be less likely to deform during use, may deform less, and/or may be more likely to survive any impact. The composite NFT 250" may thus be more robust. Further, the optical efficiency of the composite NFT 250" may not be unduly affected. Thus, performance and reliability of the composite NFT 250" and the device using the composite NFT 250" may be enhanced.

Figure 10:
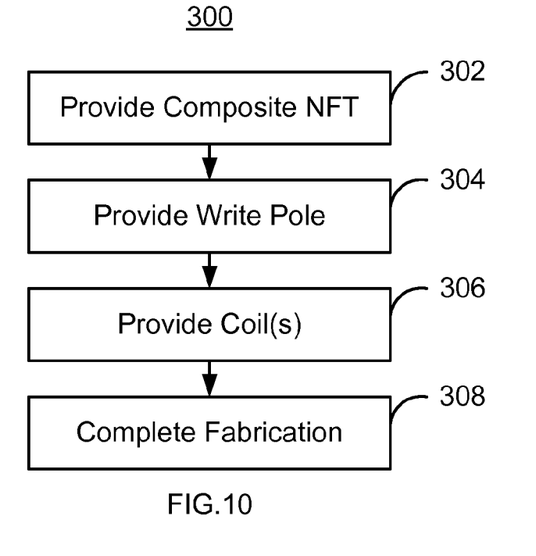
FIG. 10 is a flow chart depicting an exemplary embodiment of a method for providing an EAMR transducer having a composite NFT.

FIG. 10 depicts one embodiment of a method 300 for fabricating an EAMR transducer having a composite NFT. For simplicity, some steps may be omitted, interleaved, and/or combined. The EAMR transducer being fabricated may be part of a merged head that also includes a read head (not shown) and resides on a slider (not shown) in a disk drive. The method 300 is also described in the context of providing a single EAMR transducer. However, the method 300 may be used to fabricate multiple transducers at substantially the same time. The method 300 and system are also described in the context of particular layers. However, in some embodiments, such layers may include multiple sub-layers. The method 300 also may commence after formation of other portions of the EAMR transducer. In one embodiment, the method 300 commences after formation of portions of the waveguide, such as a core. Thus, a flat surface for formation of subsequent structures may have been provided. The method 300 is also described in the context of the composite NFT 100/100' and the EAMR head 150. However the method 300 may be used to form other composite NFTs and other EAMR heads/transducers including but not limited to the NFTs 200, 200', 200", 250, 250' and/or 250".

A composite NFT 100/100' is formed, via step 302. The composite NFT 100/100' provided in step 302 may have a pin portion 120/120' and a disk portion 110/110'. The pin portion 120/120' has a width, as viewed from the ABS, that is significantly less than the disk portion 110/110'. Step 302 includes depositing the material(s) for the NFT 100/100', providing a mask having the desired shape (e.g. disk and pin masks), and removing the exposed portion(s) of the NFT material. Step 302 may also include refilling the regions around the composite NFT 100/100' with an optical dielectric or other insulator.

A write pole 168 configured to write to a region of the media heated by the laser energy is provided, via step 304. The write pole 168 has a bottom surface, a portion of which may be thermally coupled with the top surface of a heat sink. One or more write coils 164 and 165 may also be provided for energizing the write pole 168, via step 306. Fabrication of the EAMR head 150 may be completed, via step 308. For example, a heat sink 180 and/or other structure(s) used in the EAMR disk drive may be fabricated.

Thus, an EAMR transducer 160 including a composite NFT 100/100' may be fabricated. Thus, the benefits of the composite NFT 100/100'/200/200'/200"/250/250'/250" and EAMR head 150 may be achieved. Performance and reliability of the NFT 100/100'/200/200'/200"/250/250'/250' and EAMR head 150 may be enhanced.

Figure 11:
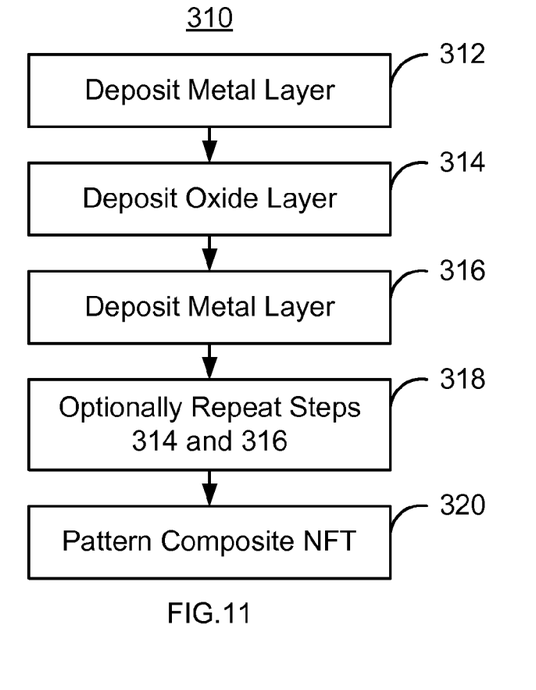
FIG. 11 is a flow chart depicting an exemplary embodiment of a method for providing a composite NFT.

FIG. 11 is a flow chart depicting an exemplary embodiment of a method 310 for fabricating a composite NFT. For simplicity, some steps may be omitted, interleaved and/or combined. The method 310 is described in the context of the composite NFTs 200, 200' and 200". However, the method 310 may be used to form another device (not shown). The method 310 also may be part of the method 300, such as step 302. The method 310 is also described in the context of providing a single NFT 200/200'/200". However, the method 310 may be used to fabricate multiple NFTs at substantially the same time. The method 310 and NFT 200/200'/200" are also described in the context of particular layers. However, in some embodiments, such layers may include multiple sub-layers.

The metal layer 201/201'/201" is provided, via step 312. An insulating layer 202/202'/202" is deposited on the metal layer 201/201'/201", via step 314. Another metal layer 203/203'/203" is deposited on the insulating layer 202/201'/201", via step 316. Steps 314 and, in some embodiments, step 316 may optionally be repeated, via step 318. Thus, the layers 204/204', 205/205', 206, 207, 208 and/or 209 may be deposited.

The composite NFT 100/100'/200/200'/200" is then patterned, via step 320. Step 320 may include depositing and patterning one or more masks for the pin and/or disk portions of the composite NFT 100/100'/200/200'/200". Thus, the composite NFT 100/100'/200/200'/200" may be provided. As a result, the benefits of the composite NFT 100/100'/200/200'/200" may be achieved.

Figure 12:
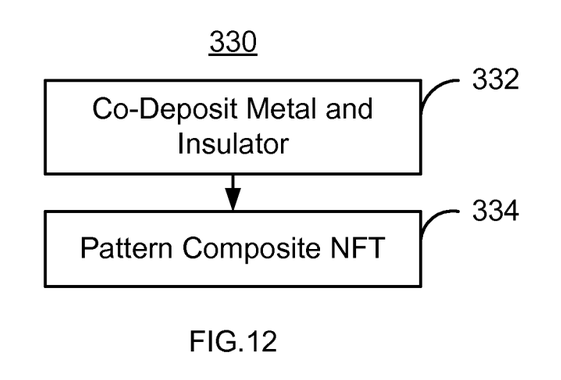
FIG. 12 is a flow chart depicting another exemplary embodiment of a method for providing a composite NFT in an EAMR transducer.

FIG. 12 is a flow chart depicting an exemplary embodiment of a method 330 for fabricating a composite NFT. For simplicity, some steps may be omitted, interleaved and/or combined. The method 330 is described in the context of the composite NFTs 250, 250' and 250". However, the method 330 may be used to form another device (not shown). The method 330 also may be part of the method 300, such as step 302. The method 330 is also described in the context of providing a single NFT 250/250'/250". However, the method 330 may be used to fabricate multiple NFTs at substantially the same time. The method 330 and NFT 250/250'/250" are also described in the context of particular layers. However, in some embodiments, such layers may include multiple sublayers.

The metal matrix 252/2527252" and the immiscible insulator 254/2547254" are co-deposited, via step 332. The metal matrix 252/2527252" and the insulator 254/2547254" are considered immiscible because insulating particles 254/2547254" are formed in the metal matrix 252/2527252". However, note that in some embodiments of the composite NFT 250' and 250", the insulating particles 254/2547254" may be dissolved in the metal lattice. Step 332 may include depositing the metal and insulator from a single composite source, simultaneously depositing the metal and insulator from separate sources or alternately depositing the metal and insulator such that insulating particles 254/2547254" are formed in the metal matrix 252/2527252".

The composite NFT 100/100'/250/250'/250" is then patterned, via step 334. Step 334 may include depositing and patterning one or more masks for the pin and/or disk portions of the composite NFT 100/100'/250/250'/250". Thus, the composite NFT 100/100'/250/250'/250" may be provided. As a result, the benefits of the composite NFT 100/100'/250/250'/250" may be achieved.

We claim:

1. An energy assisted magnetic recording (EAMR) transducer coupled with a laser for providing energy and having an air-bearing surface (ABS) configured to reside in proximity to media during use, the EAMR transducer comprising: a composite near field transducer (NFT) for focusing the energy onto a region of the media, the composite NFT including a plurality of metal layers interleaved with at least one insulating layer, the plurality of metal layers sandwiching the at least one insulating layer, a metal layer of the plurality of metal layers residing at a surface of the composite NFT, the surface of the composite NFT configured to focus the energy, the plurality of metal layers sharing a plurality of interfaces with the at least one insulating layer, the plurality of interfaces being substantially perpendicular to the ABS, the composite NFT including at least one metal and at least one insulator therein, the at least one insulator including at least one of $SiO_2$, MgO, $Al_2O_3$, $Ta_2O_5$ and C and comprising at least two volume percent of the NFT; a write pole configured to write to the region of the media, no portion of the write pole forming a part of the plurality of metal layers; and at least one coil for energizing the write pole.

2. An energy assisted magnetic recording (EAMR) transducer coupled with a laser for providing energy and having an air-bearing surface (ABS) configured to reside in proximity to media during use, the EAMR transducer comprising: a composite near field transducer (NFT) for focusing the energy onto the region of the media, the composite NFT including a plurality of metal layers interleaved with at least one insulating layer, a metal layer of the plurality of metal layers residing at a surface of the composite NFT, the surface of the composite NFT configured to focus the energy, the composite NFT including at least one metal and at least one insulator therein, and the at least one insulator including at least one of $SiO_2$, MgO, $Al_2O_3$, $Ta_2O_5$ and C and comprising at least two volume percent of the NFT; a write pole configured to write to a region of the media, no portion of the write pole forming a part of the plurality of metal layers; and at least one coil for energizing the write pole; wherein the composite NFT has a total thickness and wherein each of the plurality of metal layers is not thicker than one third of the total thickness and each of the at least one insulating layer is at least one nanometer.

3. The EAMR transducer of claim 2 wherein each of the plurality of metal layers is not more than one fifth of the total thickness.

4. An energy assisted magnetic recording (EAMR) transducer coupled with a laser for providing energy and having an air-bearing surface (ABS) configured to reside in proximity to media during use, the EAMR transducer comprising: a composite near field transducer (NFT) for focusing the energy onto a region of the media, the composite NFT including a plurality of metal layers interleaved with at least one insulating layer, a metal layer of the plurality of metal layers residing at a surface of the composite NFT, the surface of the composite NFT configured to focus the energy, the composite NFT including at least one metal and at least one insulator therein, the at least one insulator including at least one of $SiO_2$, MgO, $Al_2O_3$, $Ta_2O_5$ and C and comprising at least two volume percent of the NFT; a write pole configured to write to a region of the media, no portion of the write pole forming a part of the plurality of metal layers; and at least one coil for energizing the write pole; wherein the composite NFT has a total thickness and wherein each of the plurality of metal layers is not thicker than one half of the total thickness and each of the at least one insulating layer is not more than 2.5 nanometers thick and at least 1.5 nanometers.

5. The EAMR transducer of claim 1 wherein the at least one insulating layer includes not more than four insulating layers.

6. The EAMR transducer of claim 1:
    wherein the composite NFT has a total thickness of not more than fifty nanometers.

7. An energy assisted magnetic recording (EAMR) transducer coupled with a laser for providing energy and having an air-bearing surface (ABS) configured to reside in proximity to media during use, the EAMR transducer comprising: a composite near field transducer (NFT) for focusing the energy onto a region of the media, the composite NFT including at least one metal and at least one insulator therein; a write pole configured to write to the region of the media; and at least one coil for energizing the write pole wherein the composite NFT includes a plurality of insulating particles in a metal matrix and wherein the plurality of insulating particles includes C.

8. The EAMR transducer of claim 7 wherein the plurality of insulating particles constitute not more than twenty volume percent of the composite NFT.

9. The EAMR transducer of claim 7 wherein the plurality of insulating particles constitute at least two volume percent of the composite NFT.

10. The EAMR transducer of claim 7 wherein the plurality of insulating particles constitute at least four volume percent of the composite NFT.

11. The EAMR transducer of claim 1 wherein the at least one metal includes at least one of Au and Ag.

12. The EAMR transducer of claim 1 further comprising: a heat sink thermally coupled with the composite NFT and the write pole.

13. An energy assisted magnetic recording (EAMR) transducer coupled with a laser for providing energy and having an air-bearing surface (ABS) configured to reside in proximity to media during use, the EAMR transducer comprising: a composite near field transducer (NFT) for focusing the energy onto a region of the media, the composite NFT including a plurality of metal layers interleaved with and sandwiching at least one insulating layer, the at least one insulating layer consisting of at least one insulator, the plurality of metal layers consisting of at least one metal, a metal layer of the plurality of metal layers residing at a surface of the composite NFT, the surface of the composite NFT configured to focus the energy, the at least one metal including at least one of Au and Ag, the at least one insulator including at least one of $SiO_2$, MgO, $Al_2O_3$, $Ta_2O_5$ and C, the at least one insulator constituting at least two volume percent of the composite NFT, the plurality of metal layers sharing a plurality of interfaces with the at least one insulating layer, the plurality of interfaces being substantially perpendicular to the ABS; a write pole configured to write to the region of the media, no portion of the write pole forming a part of the plurality of metal layers; and at least one coil for energizing the write pole.

14. An energy assisted magnetic recording (EAMR) disk drive comprising: media; a slider having an air-bearing surface (ABS) configured to reside in proximity to the media during use; a laser coupled with the slider and for providing energy; an EAMR head coupled with the slider and including an EAMR transducer optically coupled with the laser and including a composite near field transducer (NFT), a write pole, and at least one coil, the composite NFT for focusing the energy onto a region of the media, the composite NFT including a plurality of metal layers interleaved with and sandwiching at least one insulating layer, a metal layer of the plurality of metal layers residing at a surface of the composite NFT, the surface of the composite NFT configured to focus the energy, the plurality of metal layers sharing a plurality of interfaces with the at least one insulating layer, the plurality of interfaces being substantially perpendicular to the ABS, no portion of the write pole forming a part of the plurality of metal layers, the composite NFT including at least one metal and at least one insulator therein, the at least one insulator including at least one of $SiO_2$, MgO, $Al_2O_3$, $Ta_2O_5$ and C and comprising at least two volume percent of the NFT.

15. A method for providing an energy assisted magnetic recording (EAMR) transducer coupled with a laser for providing energy and having an air-bearing surface (ABS) configured to reside in proximity to media during use, the method comprising: providing a composite near field transducer (NFT) for focusing the energy onto a region of the media, the composite NFT including a plurality of metal layers interleaved with and sandwiching at least one insulating layer, a metal layer of the plurality of metal layers residing at a surface of the composite NFT, the surface of the composite NFT configured to focus the energy, the plurality of metal layers sharing a plurality of interfaces with the at least one insulating layer, the plurality of interfaces being substantially perpendicular to the ABS, the composite NFT including at least one metal and at least one insulator therein, the at least one insulator including at least one of $SiO_2$, MgO, $Al_2O_3$, $Ta_2O_5$ and C and comprising at least two volume percent of the NFT; providing a write pole configured to write to a region of the media; and providing at least one coil for energizing the write pole.

16. The method of claim 15 wherein the step of providing the composite NFT further includes: depositing a first metal layer of the plurality of metal layers; depositing an insulating layer of the at least one insulating layer; depositing a second metal layer of the plurality of metal layers; and patterning the composite NFT.

17. A method for providing an energy assisted magnetic recording (EAMR) transducer coupled with a laser for providing energy and having an air-bearing surface (ABS) configured to reside in proximity to media during use, the method comprising: providing a composite near field transducer (NFT) for focusing the energy onto a region of the media, wherein the step of providing the composite NFT further includes: depositing a first metal layer of a plurality of metal layers, the plurality of metal layers including at least one metal therein; depositing an insulating layer of at least one insulating layer, the at least one insulating layer including at least one insulator therein, the at least one insulator including at least one of $SiO_2$, MgO, $Al_2O_3$, $Ta_2O_5$ and C and comprising at least two volume percent of the NFT; depositing a second metal layer of the plurality of metal layers; and patterning the composite NFT; providing a write pole configured to write to the region of the media; and providing at least one coil for energizing the write pole; wherein the composite NFT has a total thickness, wherein each of the first metal layer and the second metal layer is not more than one half of the total thickness and the insulating layer is at least one nanometer thick and not thicker than three nanometers.

18. The method of claim 17 wherein the insulating layer is at least 1.5 nanometer thick but not more than 2.5 nanometers thick.

19. A method for providing an energy assisted magnetic recording (EAMR) transducer coupled with a laser for providing energy and having an air-bearing surface (ABS) configured to reside in proximity to media during use, the method comprising: providing a composite near field transducer (NFT) for focusing the energy onto a region of the media, wherein the step of providing the composite NFT further includes: depositing a first metal layer of a plurality of metal layers, the plurality of metal layers including at least one metal therein; depositing an insulating layer of at least one insulating layer, the at least one insulating layer including at least on insulator therein, the at least one insulator including at least one of $SiO_2$, MgO, $Al_2O_3$, $Ta_2O_5$ and C and comprising at least two volume percent of the NFT; depositing a second metal layer of the plurality of metal layers; and patterning the composite NFT; repeating the insulating layer depositing and second metal layer depositing steps until a first desired number of metal layers and a second desired number of insulating layers are provided, the first desired number of metal layers sharing a plurality of interfaces with the second desired number of insulating layers, the plurality of interfaces being substantially perpendicular to the ABS; providing a write pole configured to write to the region of the media; and providing at least one coil for energizing the write pole.

20. The method of claim 19 wherein the first desired number of metal layers is not more than five and the second desired number of insulating layers is not more than four.

21. The method of claim 17 wherein the composite NFT has a total thickness of not more than fifty nanometers.
wherein the composite NFT has a total thickness of not more than fifty nanometers.

22. A method for providing an energy assisted magnetic recording (EAMR) transducer coupled with a laser for providing energy and having an air-bearing surface (ABS) configured to reside in proximity to media during use, the method comprising: providing a composite near field transducer (NFT) for focusing the energy onto a region of the media, the composite NFT including at least one metal and at least one insulator therein, wherein the at least one metal and the at least one insulator are immiscible and the step of providing the composite NFT further includes: co-depositing the at least one insulator and the at least one metal such that the composite NFT includes a plurality of insulating particles in a metal matrix, the plurality of insulating particles including C; providing a write pole configured to write to a region of the media; and providing at least one coil for energizing the write pole.

23. The method of claim 22 wherein the plurality of insulating particles constitute not more than twenty volume percent of the composite NFT.

24. The method of claim 22 wherein the plurality of insulating particles constitute at least two volume percent of the composite NFT.

25. The method of claim 22 wherein the plurality of insulating particles constitute at least four volume percent of the composite NFT.

26. The method of claim 15 wherein the at least one metal includes at least one of Au and Ag.

* * * * *